US012167707B1

(12) United States Patent
Blum et al.

(10) Patent No.: US 12,167,707 B1
(45) Date of Patent: *Dec. 17, 2024

(54) SEED PLANTER WITH POSITIONABLE TANK

(71) Applicant: 2BK, LLC, York, NE (US)

(72) Inventors: Benjamin D. Blum, York, NE (US); Kelly Driewer, York, NE (US); Bryan Driewer, Bradshaw, NE (US)

(73) Assignee: 2BK, LLC, York, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,651

(22) Filed: Mar. 13, 2023

Related U.S. Application Data

(63) Continuation of application No. 16/874,105, filed on May 14, 2020, now Pat. No. 11,602,097.

(60) Provisional application No. 62/847,638, filed on May 14, 2019.

(51) Int. Cl.
*A01C 7/20* (2006.01)
*A01C 7/08* (2006.01)

(52) U.S. Cl.
CPC .............. *A01C 7/201* (2013.01); *A01C 7/085* (2013.01)

(58) Field of Classification Search
CPC ........ A01C 7/085; A01C 7/201; A01C 23/008
See application file for complete search history.

(56) References Cited

U.S. PATENT DOCUMENTS

| 2,680,624 | A | * | 6/1954 | Pool ...................... A01C 23/008 |
| | | | | 280/760 |
| 4,162,796 | A | | 7/1979 | Mead |
| 4,683,987 | A | | 8/1987 | Sakata et al. |
| 6,581,530 | B1 | | 6/2003 | Hall et al. |
| 7,762,201 | B2 | | 7/2010 | Jaime et al. |
| 10,602,733 | B1 | | 3/2020 | Beyea |
| 11,602,097 | B1 | * | 3/2023 | Blum ...................... A01C 7/085 |
| 2002/0043194 | A1 | | 4/2002 | Kinzenbaw et al. |
| 2007/0044694 | A1 | | 3/2007 | Martin |
| 2007/0256893 | A1 | | 11/2007 | Horn et al. |
| 2007/0256894 | A1 | | 11/2007 | Horn et al. |
| 2010/0126742 | A1 | | 5/2010 | Poole et al. |
| 2014/0060402 | A1 | | 3/2014 | Blunier et al. |
| 2014/0109813 | A1 | | 4/2014 | Wilhelmi et al. |
| 2014/0224843 | A1 | | 8/2014 | Rollenhagen |
| 2015/0101517 | A1 | | 4/2015 | Borgmann et al. |

(Continued)

*Primary Examiner* — Jamie L McGowan
(74) *Attorney, Agent, or Firm* — Mallory M. Henninger; Advent, LLP

(57) ABSTRACT

A seed planter assembly for planting seeds in rows throughout a field includes at least one tank for storing the seeds and a seed hose in communication with the at least one tank for delivering the seeds to the field. The seed planter assembly also includes a support frame for supporting the at least one tank and the seed hose, and a linkage assembly (e.g., including a four-bar linkage) coupled with the support frame and the at least one tank. The linkage assembly is configured for lifting the at least one tank from a first orientation proximate to a support surface to a second orientation spaced farther apart from the support surface. The seed planter assembly can also include an actuator (e.g., a hydraulic actuator) connected between the support frame and the linkage assembly for moving the at least one tank between the first orientation and the second orientation.

17 Claims, 17 Drawing Sheets

(56) References Cited

U.S. PATENT DOCUMENTS

| | | |
|---|---|---|
| 2015/0102593 A1 | 4/2015 | Slawson |
| 2016/0050838 A1 | 2/2016 | Van Mill et al. |
| 2016/0165793 A1 | 6/2016 | Azenha et al. |
| 2017/0135331 A1 | 5/2017 | Jarrassier |
| 2017/0245425 A1 | 8/2017 | Grimm et al. |
| 2017/0313255 A1 | 11/2017 | Brett et al. |
| 2018/0243771 A1 | 8/2018 | Davis et al. |
| 2018/0243773 A1 | 8/2018 | Davis et al. |
| 2018/0338405 A1 | 11/2018 | Connell et al. |
| 2019/0000012 A1 | 1/2019 | Yagyu et al. |
| 2019/0021222 A1 | 1/2019 | Schwalbe et al. |
| 2019/0053422 A1 | 2/2019 | Holst |
| 2021/0084884 A1 | 3/2021 | Ishikawa et al. |
| 2022/0023897 A1 | 1/2022 | Atchison |

* cited by examiner

US 12,167,707 B1

SEED PLANTER WITH POSITIONABLE TANK

CROSS-REFERENCE TO RELATED APPLICATIONS

The present application is a continuation under 35 U.S.C. § 120 of U.S. patent application Ser. No. 16/874,105, filed May 14, 2020, and titled "SEED PLANTER WITH POSITIONABLE TANK." which itself claims the benefit under 35 U.S.C. § 119 (e) of U.S. Provisional Application Ser. No. 62/847,638, filed May 14, 2019, and titled "SEED PLANTER WITH POSITIONABLE TANK." U.S. patent application Ser. No. 16/874,105 and U.S. Provisional Application Ser. No. 62/847,638 are herein incorporated by reference in their entireties.

BACKGROUND

A planter is a farm implement that can plant (e.g., sow) seeds in rows throughout a field.

DRAWINGS

The Detailed Description is described with reference to the accompanying figures. The use of the same reference numbers in different instances in the description and the figures may indicate similar or identical items.

DETAILED DESCRIPTION

Figure 1:
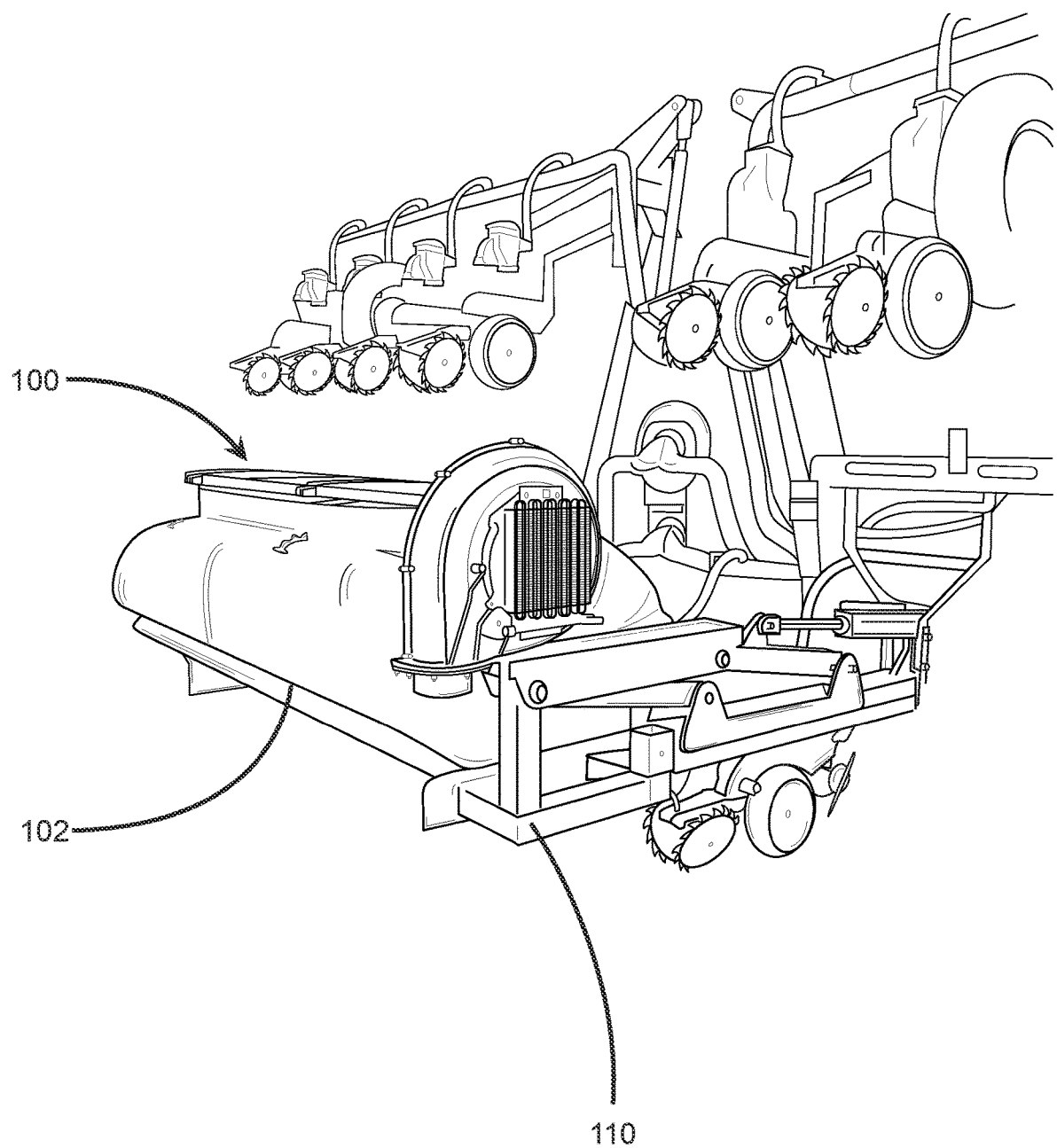
FIG. 1 is a perspective view illustrating a seed planter assembly in accordance with example embodiments of the present disclosure.
Figure 2:
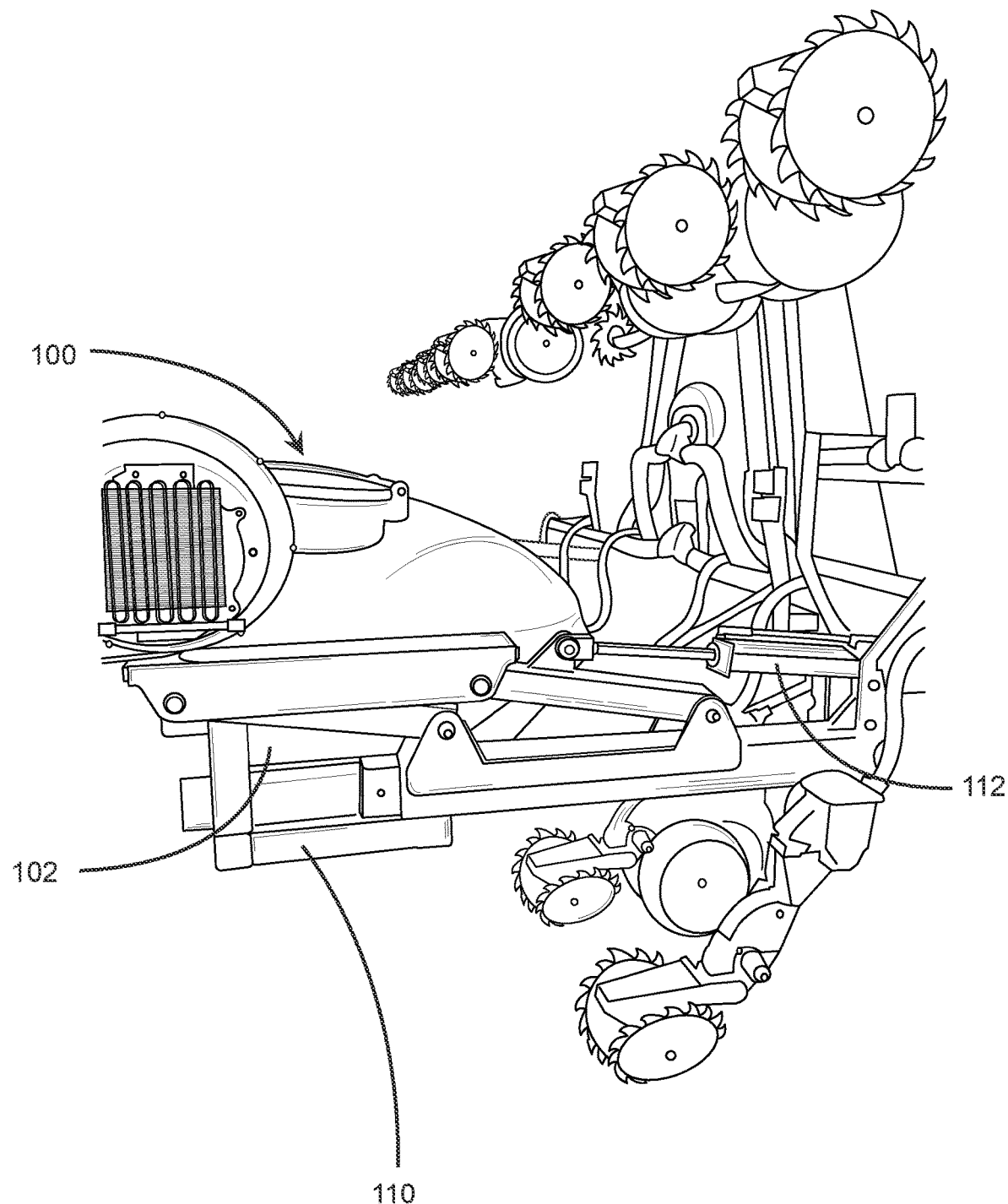
FIG. 2 is another perspective view of the seed planter assembly illustrated in FIG. 1.
Figure 3:
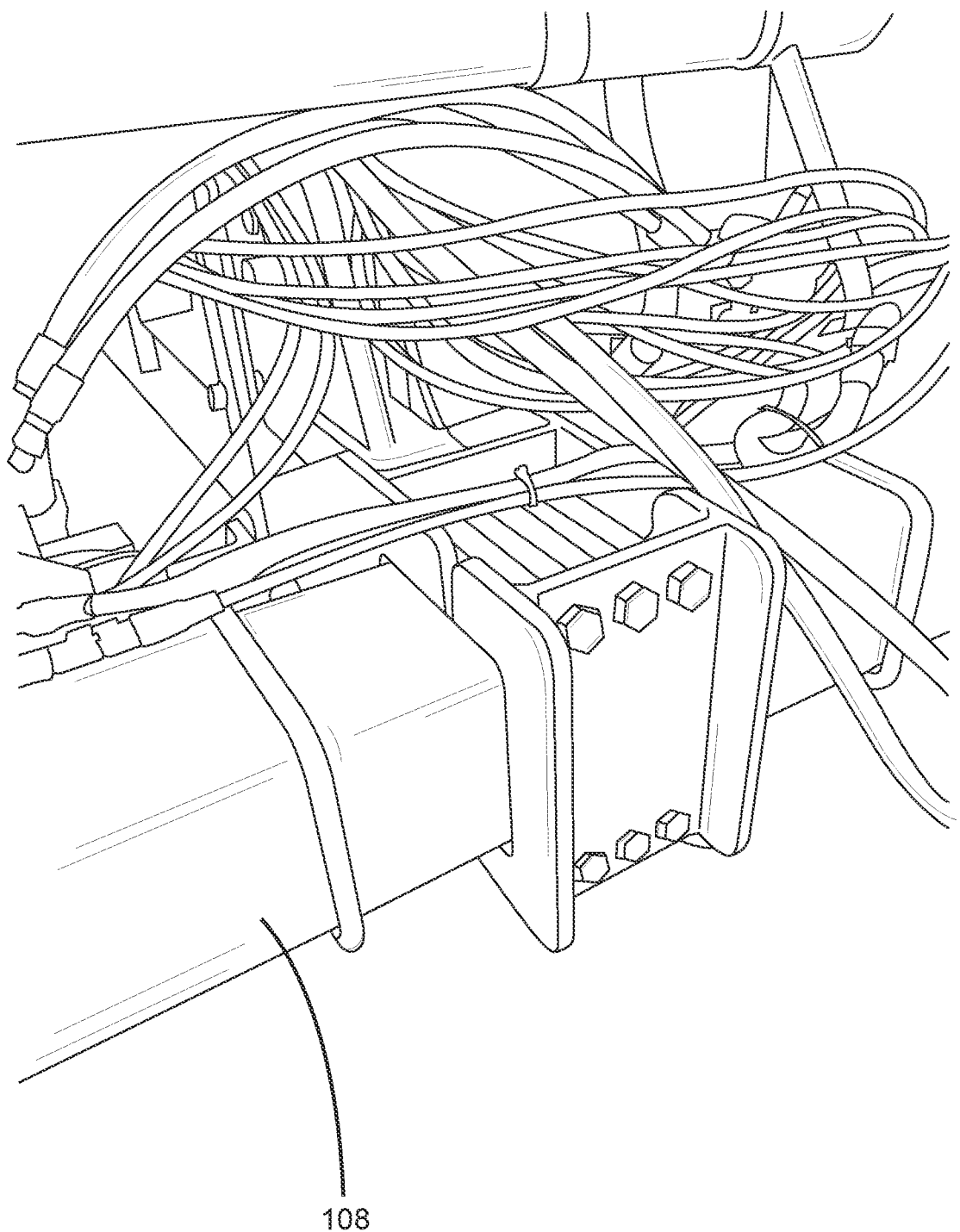
FIG. 3 is a further perspective view of the seed planter assembly illustrated in FIG. 1.
Figure 4:
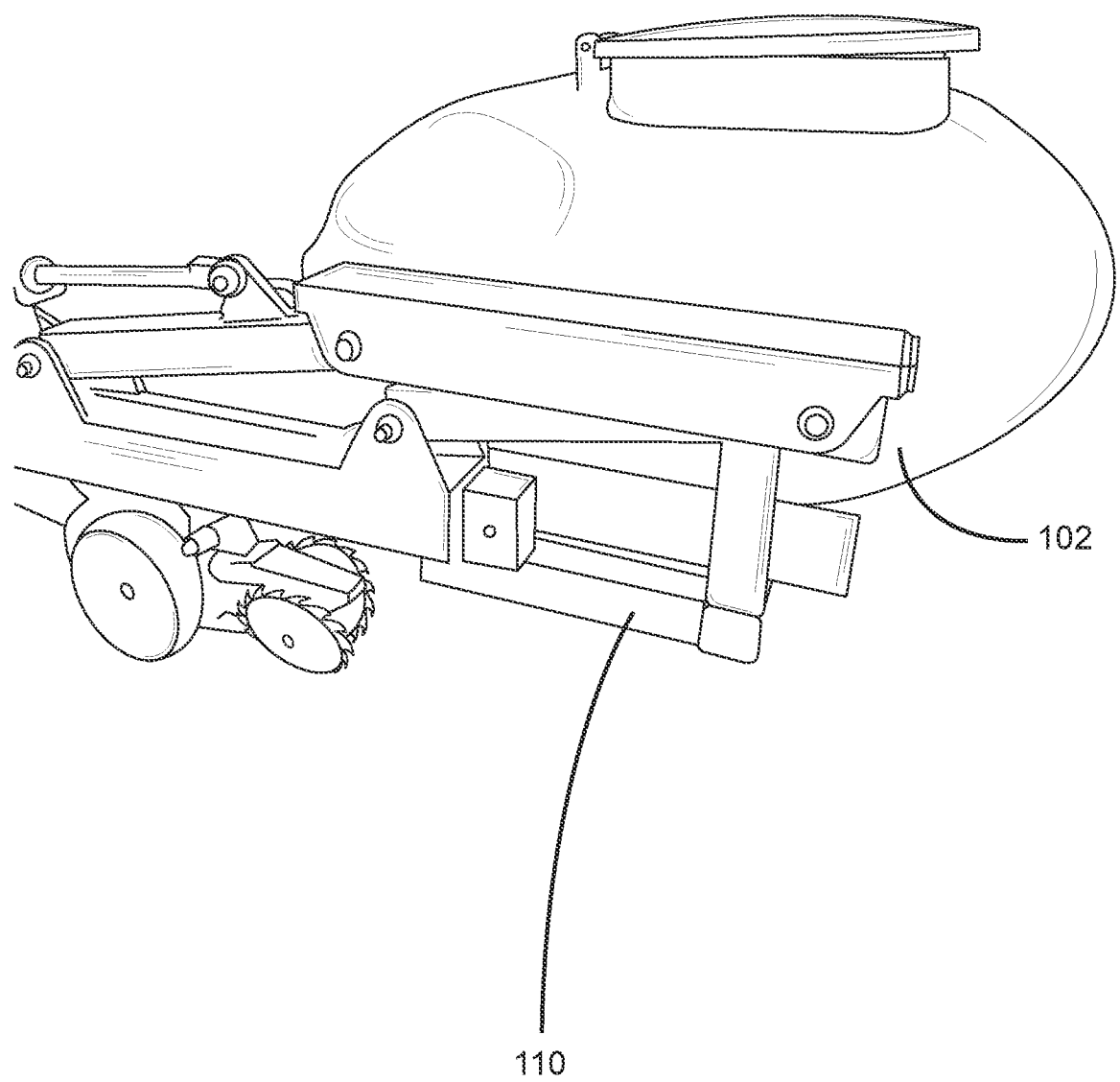
FIG. 4 is a perspective view of the seed planter assembly illustrated in FIG. 1.
Figure 5:
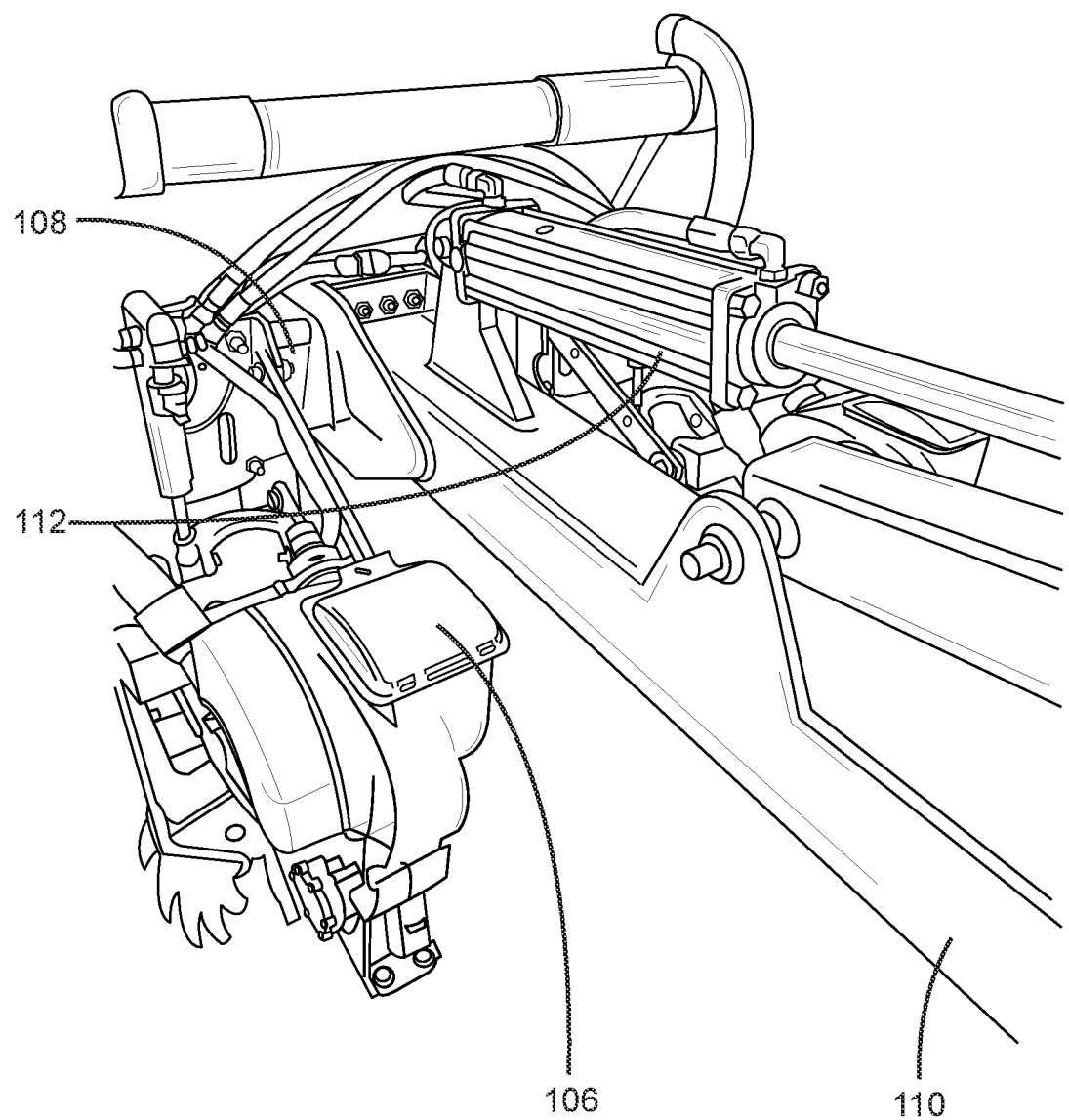
FIG. 5 is another perspective view of the seed planter assembly illustrated in FIG. 1.
Figure 6:
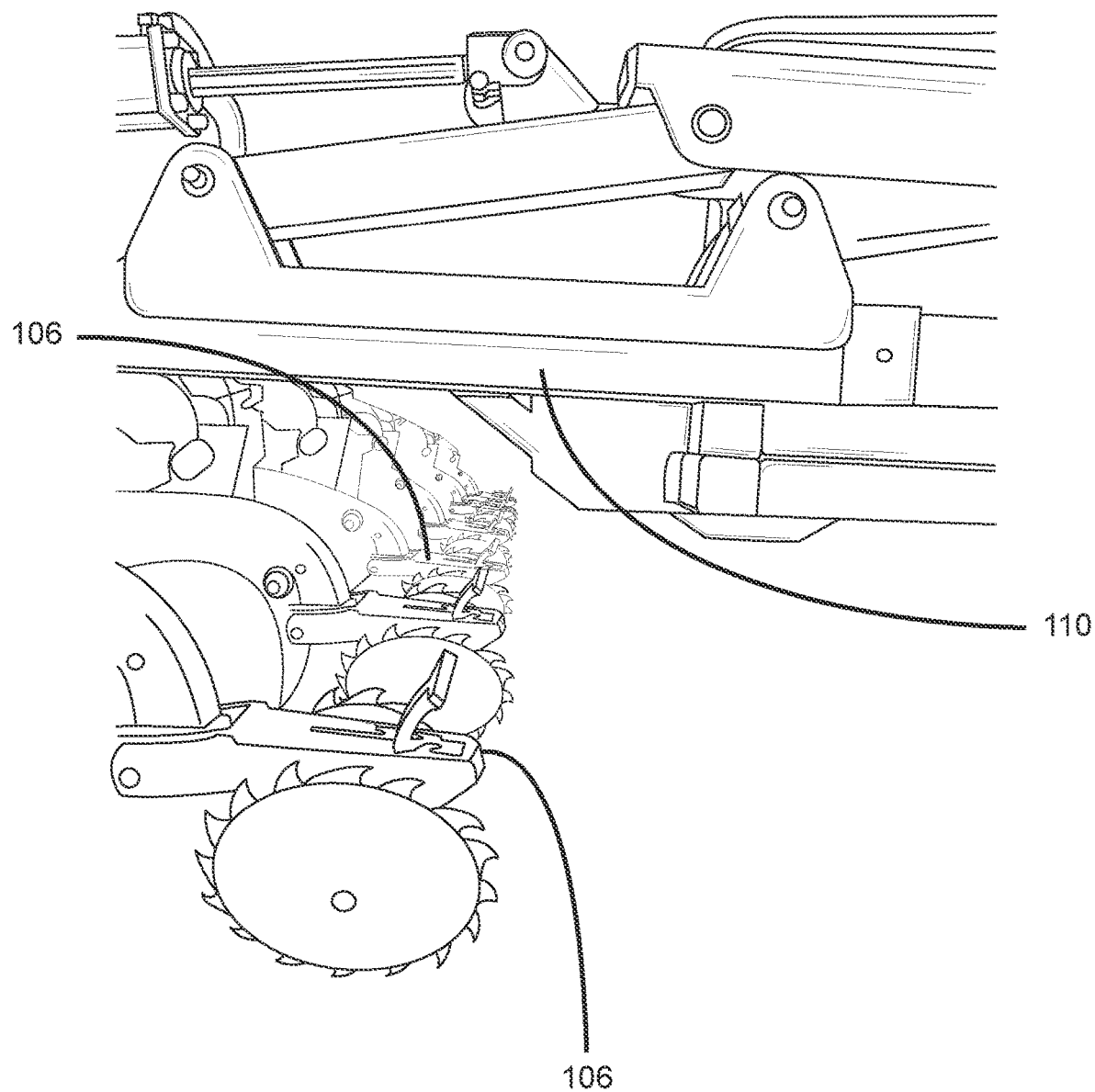
FIG. 6 is a further perspective view of the seed planter assembly illustrated in FIG. 1.
Figure 7:
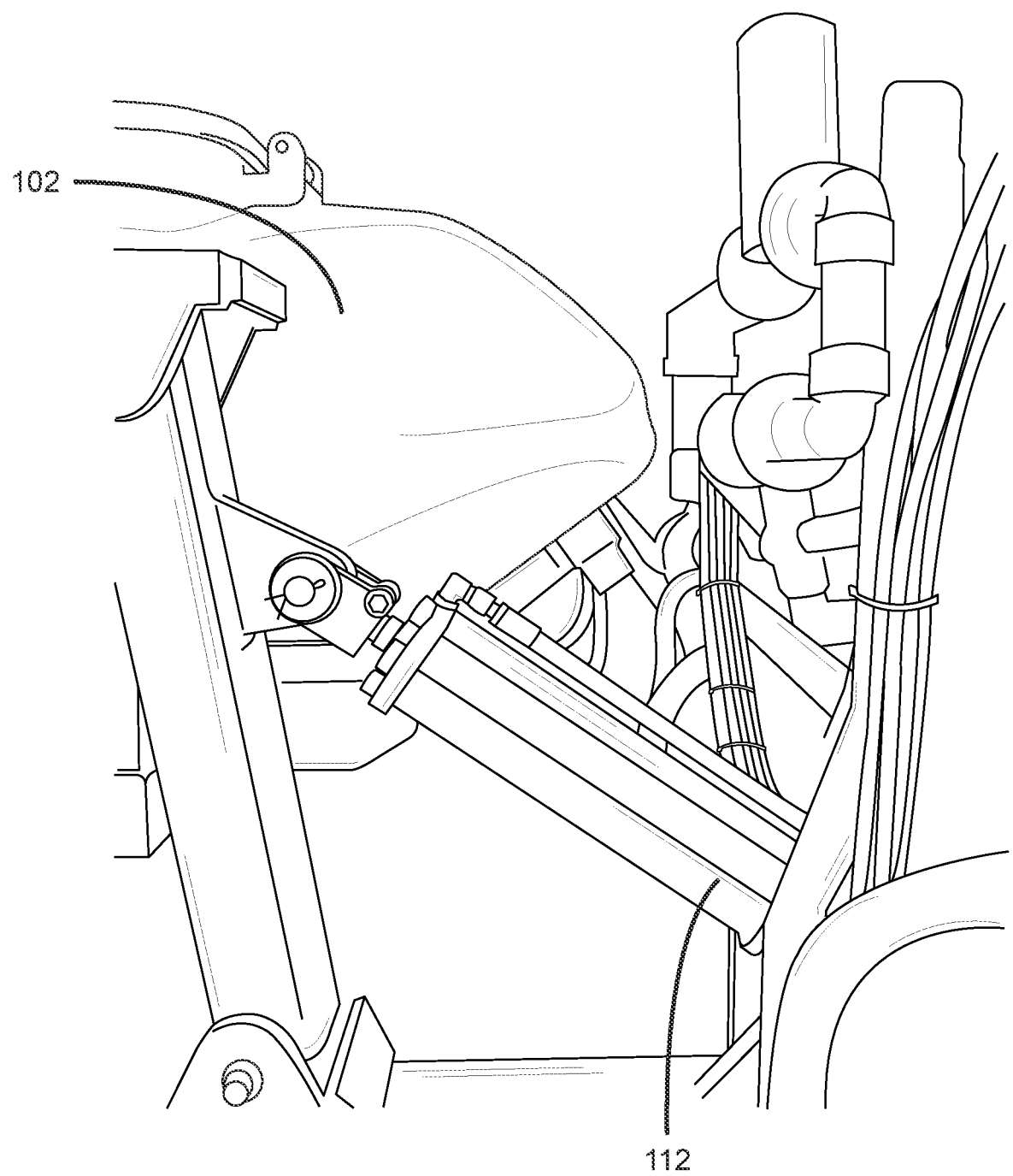
FIG. 7 is a perspective view of the seed planter assembly illustrated in FIG. 1.
Figure 8:
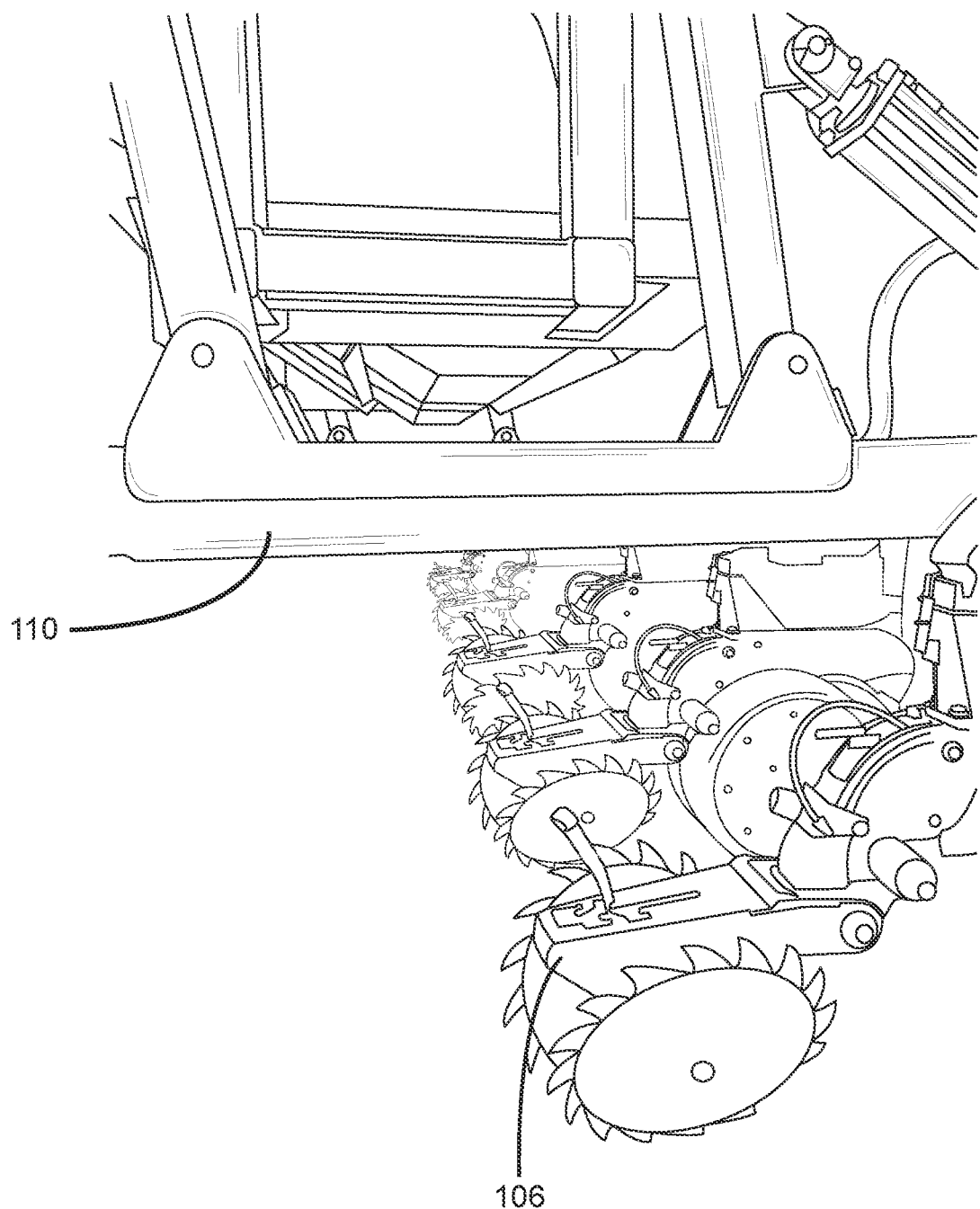
FIG. 8 is another perspective view of the seed planter assembly illustrated in FIG. 1.
Figure 9:
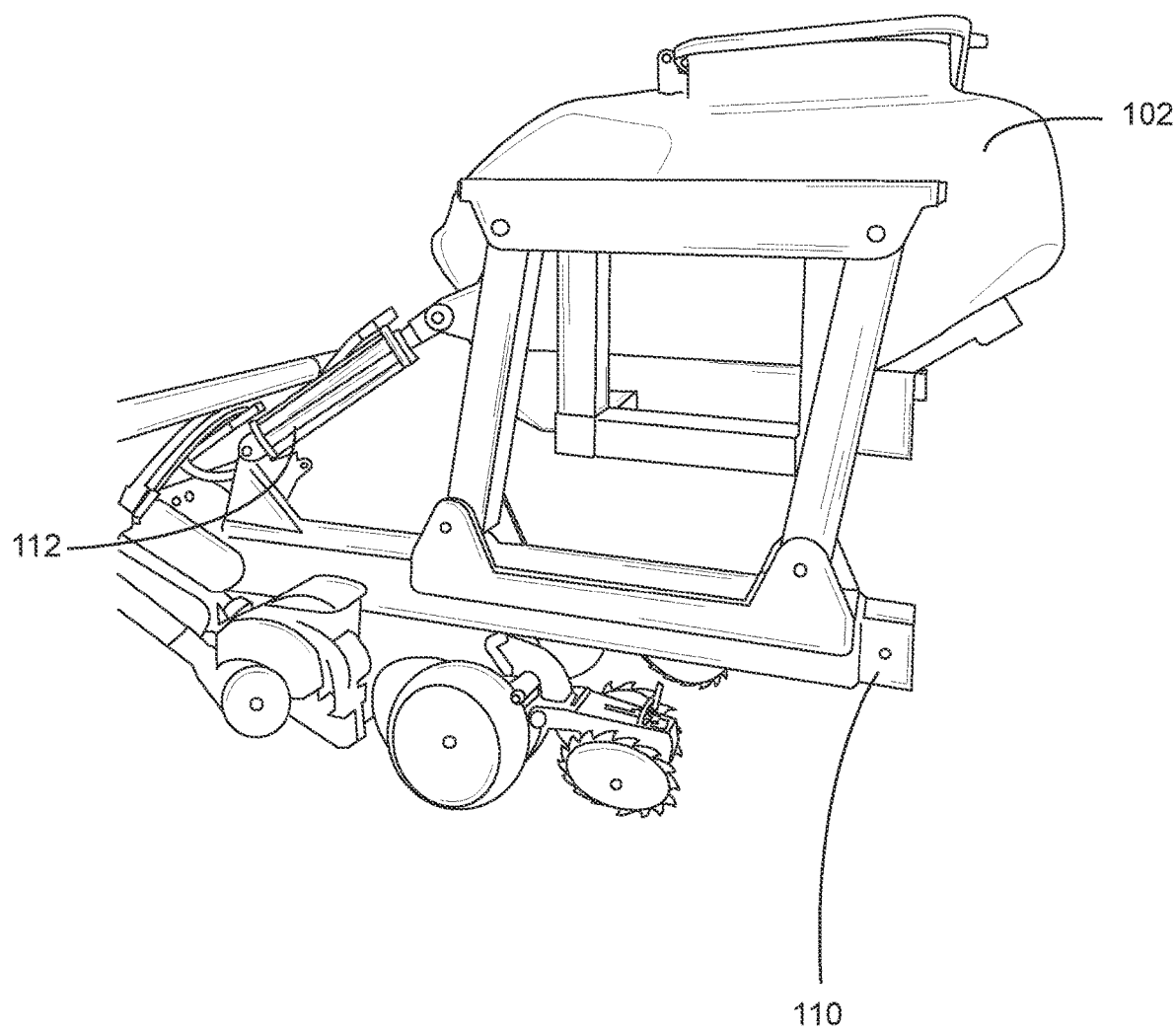
FIG. 9 is a further perspective view of the seed planter assembly illustrated in FIG. 1.
Figure 10:
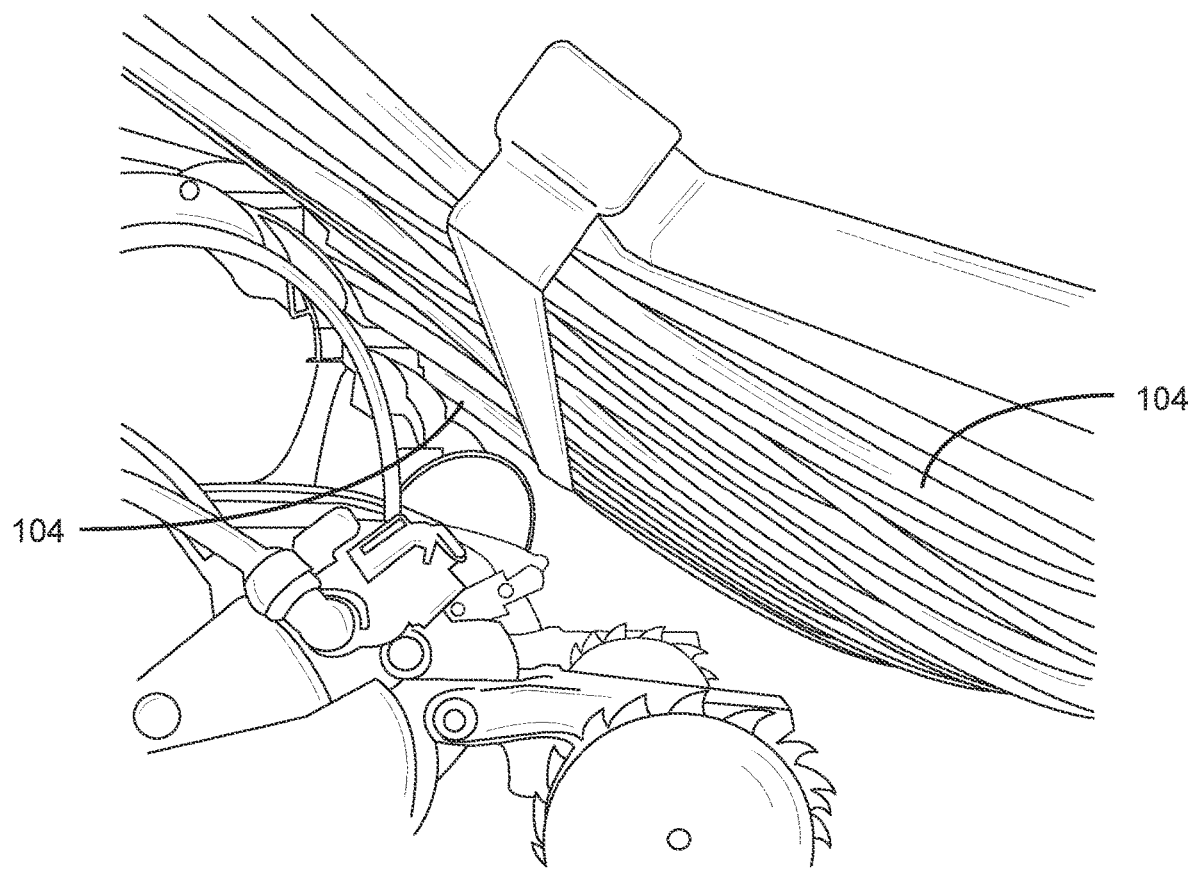
FIG. 10 is a perspective view of the seed planter assembly illustrated in FIG. 1.
Figure 11:
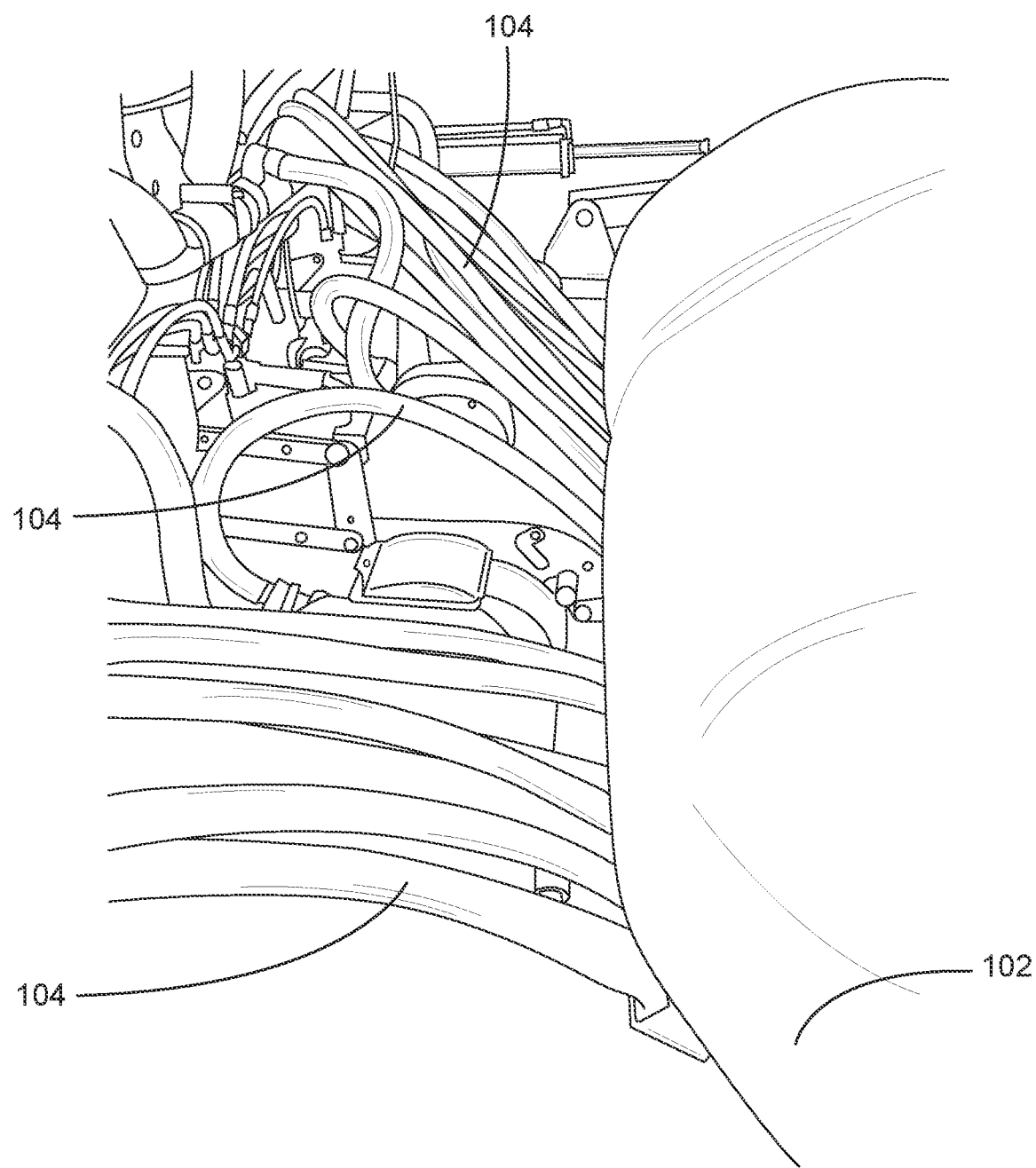
FIG. 11 is another perspective view of the seed planter assembly illustrated in FIG. 1.
Figure 12:
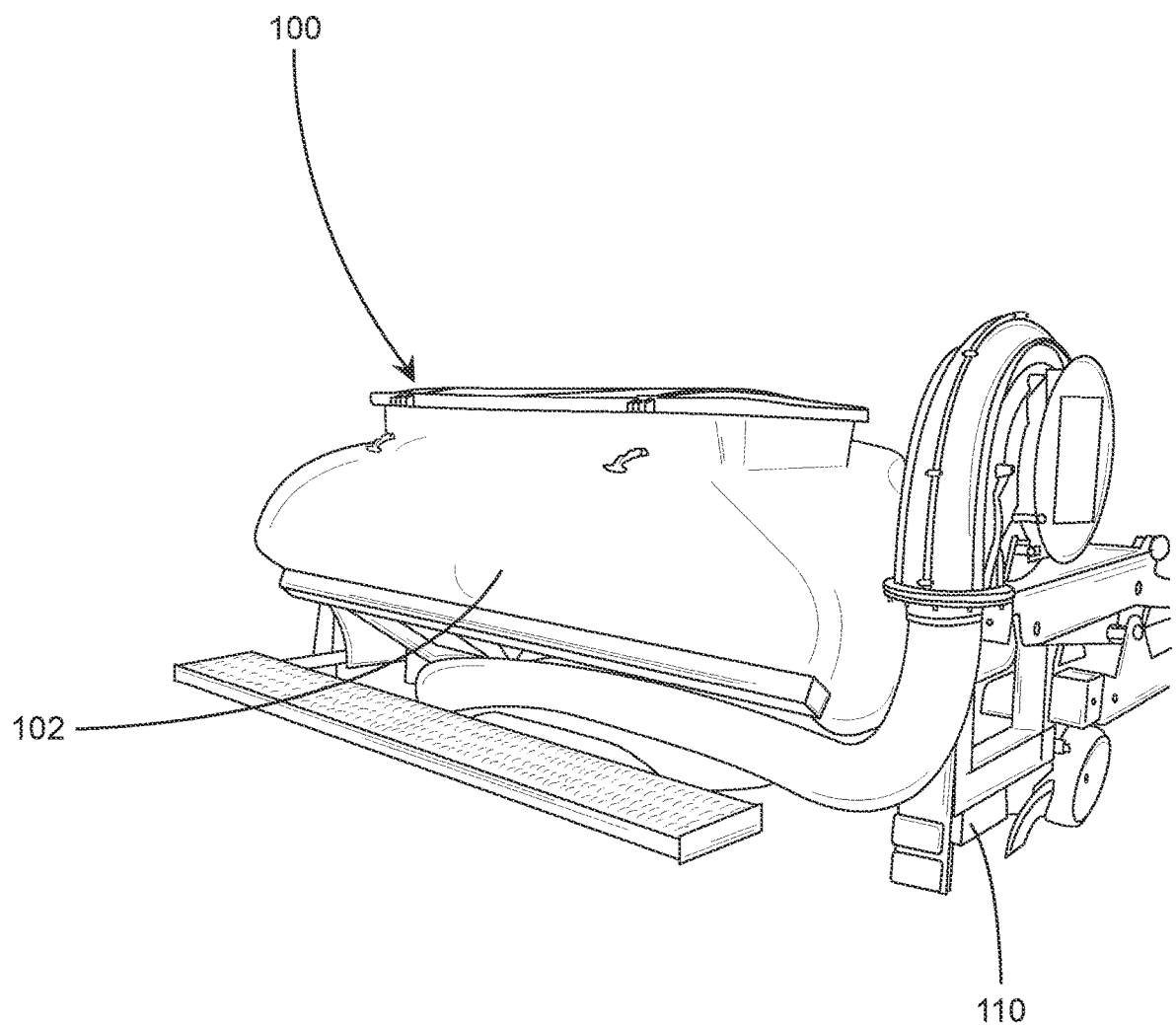
FIG. 12 is a further perspective view of the seed planter assembly illustrated in FIG. 1.
Figure 13:
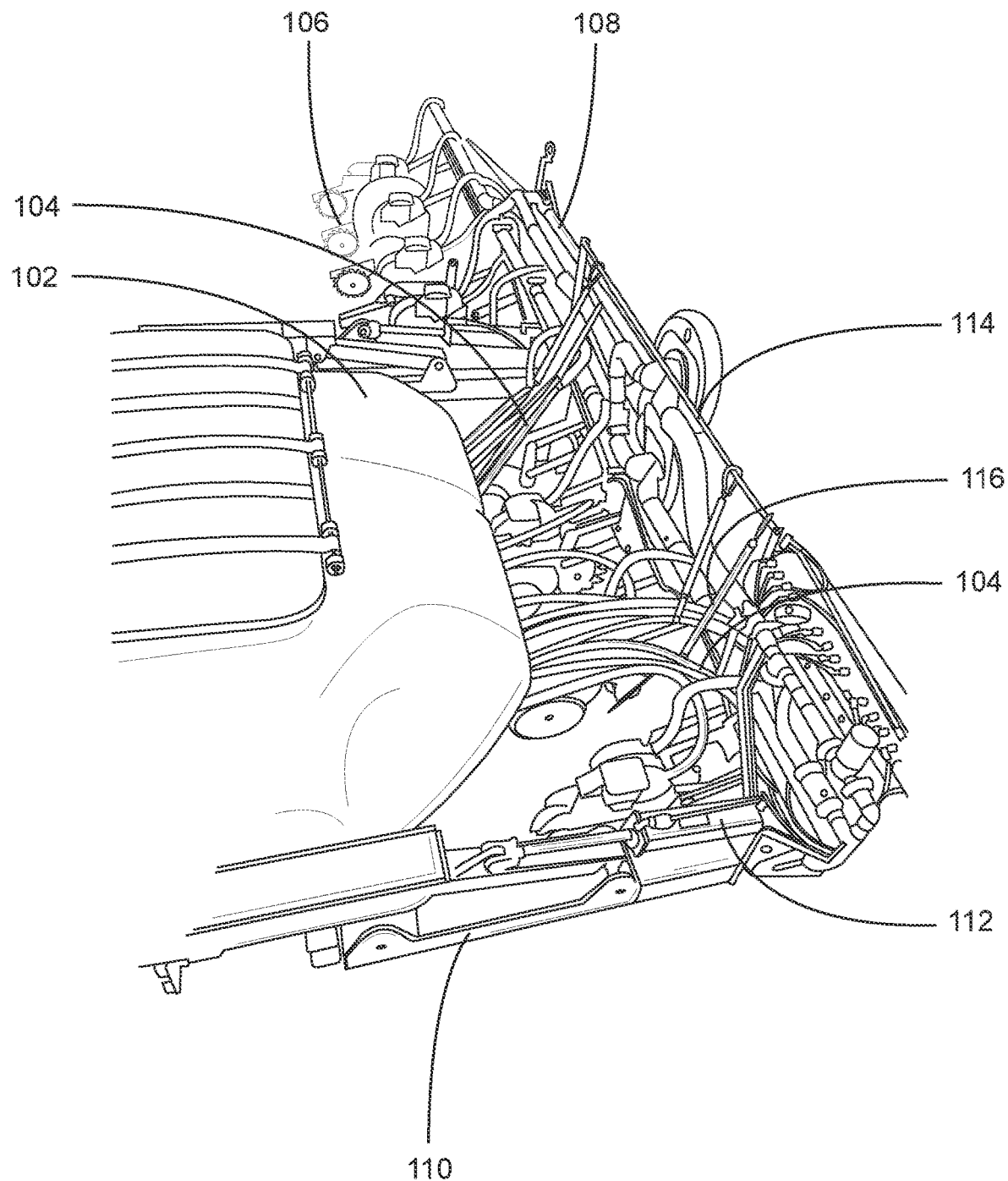
FIG. 13 is a perspective view of the seed planter assembly illustrated in FIG. 1.
Figure 14:
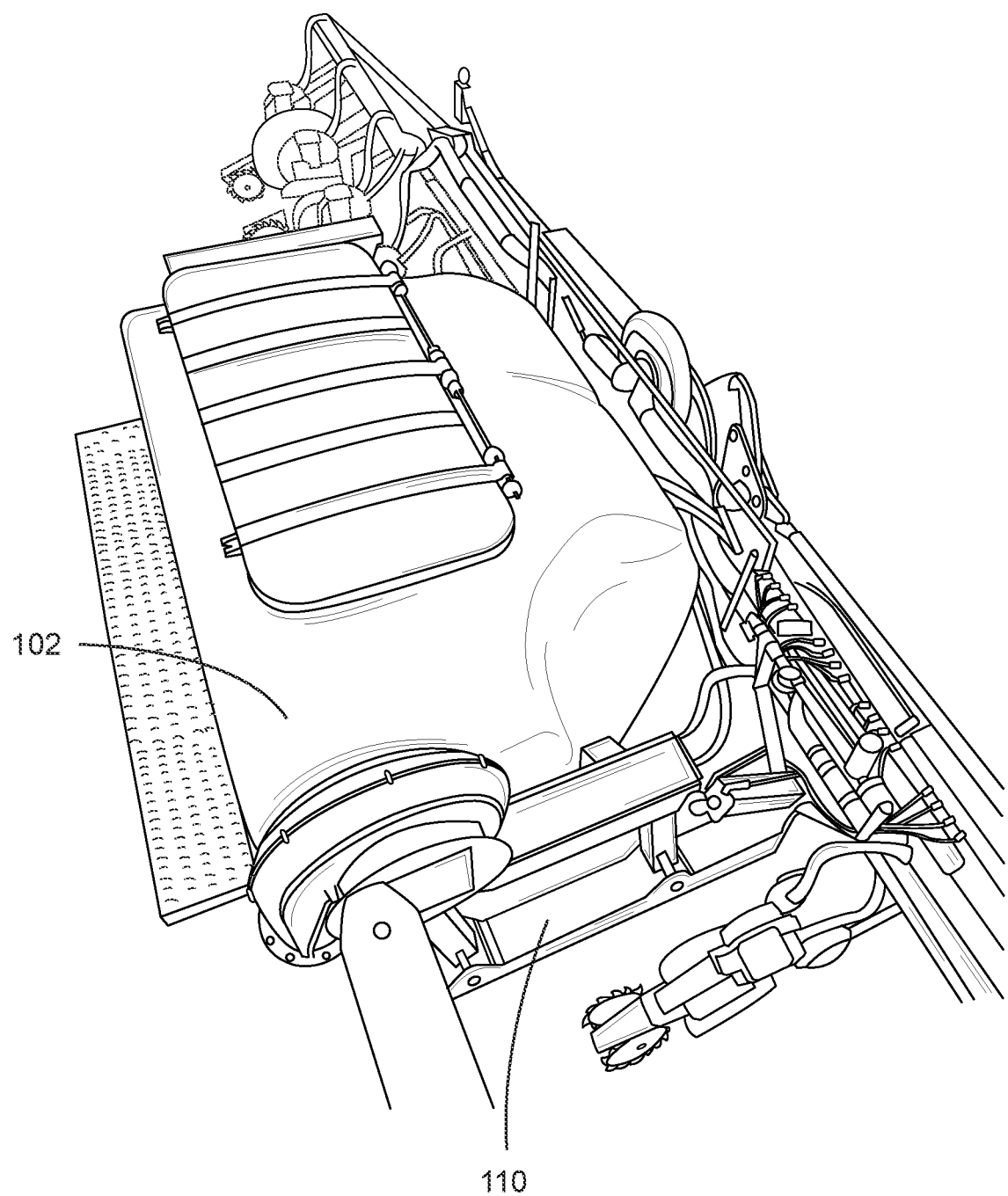
FIG. 14 is another perspective view of the seed planter assembly illustrated in FIG. 1.
Figure 15:
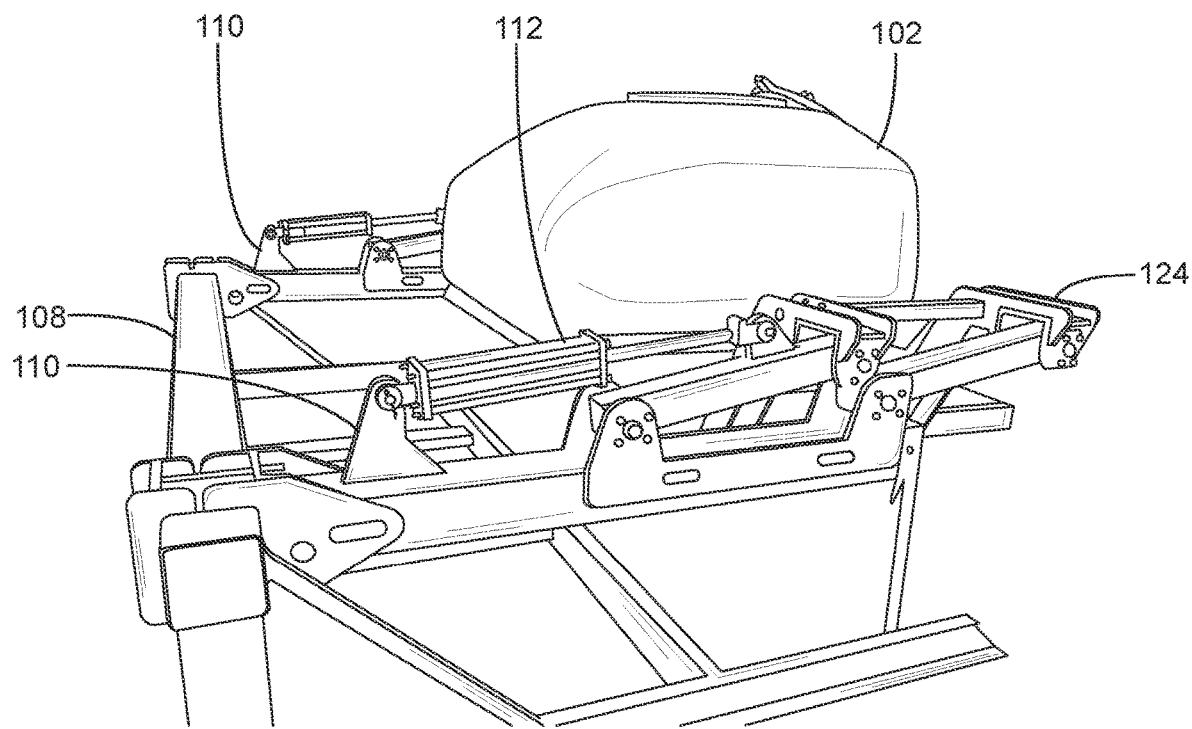
FIG. 15 is a perspective view illustrating a tank, a support frame, linkage assemblies, and hydraulic actuators for a seed planter assembly, such as the seed planter assembly illustrated in FIG. 1, in accordance with example embodiments of the present disclosure.
Figure 16:
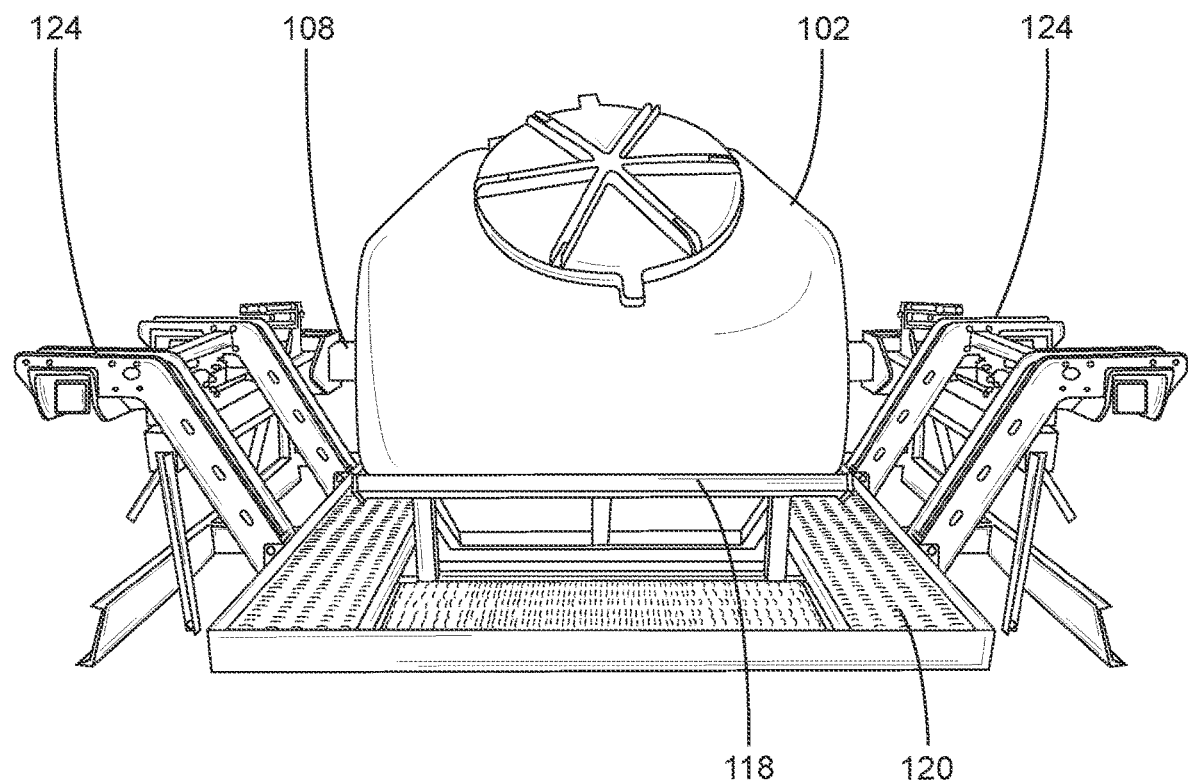
FIG. 16 is another perspective view of the tank, support frame, linkage assemblies, and hydraulic actuators illustrated in FIG. 15.
Figure 17:
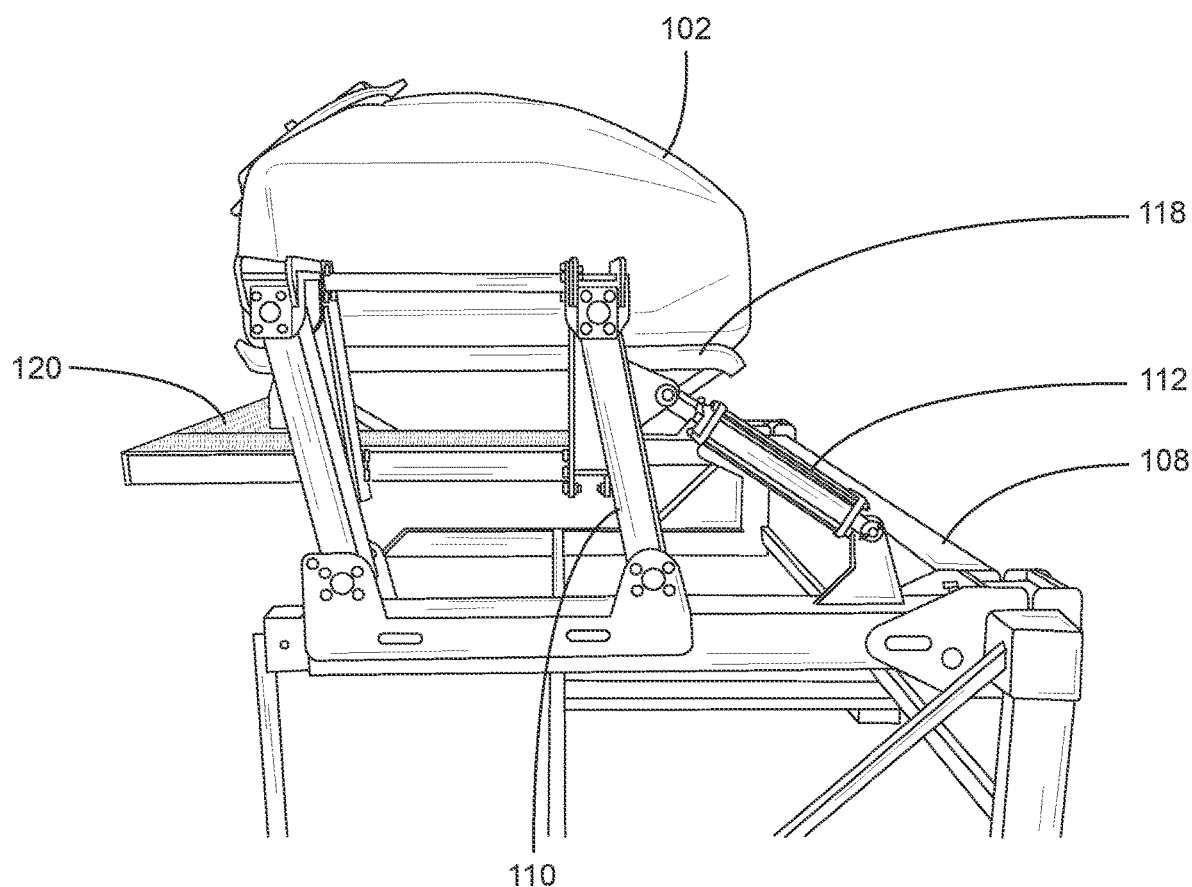
FIG. 17 is a further perspective view of the tank, support frame, linkage assemblies, and hydraulic actuators illustrated in FIG. 15.

Referring generally to FIGS. 1 through 17, a seed planter assembly 100 farm implement is described. In embodiments of the disclosure, the seed planter assembly 100 is configured for planting seeds in rows, e.g., throughout an agricultural field. For example, the seed planter assembly 100 can be towed behind a tractor or another piece of agricultural equipment. In some embodiments, the seed planter assembly 100 can be connected to the tractor with a connector, such as a drawbar, a three-point hitch, and so forth. The seed planter assembly 100 includes one or more tanks that can be lowered to the ground for filling with seed and then raised above ground for dispensing seed, as more fully described herein. Lowering the tanks to the ground facilitates ease and efficiency of refilling by an operator (e.g., as opposed to an operator climbing a ladder or another extension device to reach an elevated tank for refilling operations).

The seed planter assembly 100 can include one or more hoppers or tanks 102 for storing seeds. The seed planter assembly 100 can also include one or more seed hoses 104 connected to and in communication with a tank 102. In embodiments of the disclosure, the seed hoses 104 are configured to deliver seeds from the tank 102 to a field in multiple rows. The number of rows can vary. For example, twelve (12) seed hoses 104 may be connected to a single tank 102 of a seed planter assembly 100. In another example, twelve (12) seed hoses 104 may be connected to a first tank 102 of a seed planter assembly 100 and another (12) twelve seed hoses 104 may be connected to a second tank 102 of the seed planter assembly 100. However, these numbers of tanks and hoses are provided by way of example and are not meant to limit the present disclosure. In other embodiments, different numbers of tanks and/or hoses may be included with a seed planter assembly 100. For example, a seed planter assembly 100 may include enough tanks and hoses to supply fifty-four (54) rows of a field with seeds. In some embodiments, a single seed tank 102 or bin may be included for each row. In some embodiments, spacing between adjacent rows may be about thirty inches (30").

As described, the tank 102 may be included with a manifold system configured to meter out the seeds to the seed hoses 104. In some embodiments, a fan (e.g., a hydraulically driven fan) may move the seed from a tank 102 through a seed hose 104 and deliver the seed to a row unit 106 associated with the seed hose 104. The seed can then be deposited onto the field at the row unit 106. In embodiments of the disclosure, the one or more tanks 102 are supported by a support frame 108, which also supports the seed hoses 104. A tank 102 is connected to the support frame 108 by one or more linkage assemblies 110 coupled with the support frame 108. In some embodiments, a linkage assembly 110 is a four-bar linkage that maintains the tank 102 in a substantially horizontal orientation with respect the ground. However, this type of linkage is provided by way of example only. In other embodiments, a different type of linkage may be provided, including a linkage that positions the tank 102 at one or more different angles with respect to the ground.

The one or more linkage assemblies 110 are configured to lift a tank 102 from a first orientation proximate to a support surface (e.g., proximate to the ground) to a second orientation spaced farther apart from the support surface (e.g., spaced apart from the ground). For example, while in a first orientation proximate to the ground, the tank 102 may be filled with seed for subsequent dispensing through the seed hoses 104. Then, the tank 102 may be moved by the linkage assemblies 110 from the first orientation proximate to the ground about twenty inches (20") forward (e.g., toward the tractor or other piece of agricultural equipment towing the seed planter assembly 100) and about twenty inches (20") away from the ground (e.g., vertically upward). In the second orientation spaced apart from the ground, the seed stored in the tank 102 can be dispensed through the seed hoses 104. In embodiments, the linkage assembly 110 may be caused to move the tanks 102 by one or more actuators, such as hydraulic actuators 112 or other actuators connected between the support frame 108 and a linkage assembly 110 (e.g., one or more pneumatic actuators, electric motor-driven screws, and so forth).

In some embodiments, a tank 102 may be formed from a plastic material and may be supported at the linkage assembly 110 by a supporting structure, such as a metal saddle 118 or another type of support. However, a plastic tank 102 is provided by way of example and is not meant to limit the present disclosure. In some embodiments, the tank 102 may be self-supporting at the linkage assembly 110 (e.g., constructed from a metal material or another rigid material). Further, the tank 102 may be mounted as close as possible to the row units 106 for dispensing the seed while still being able to move between the first and second orientations without interfering with the row units 106. In this manner, the tank 102 can be arranged to provide visibility for an operator of the tractor or other piece of agricultural equipment towing the seed planter assembly 100 when the tank 102 is in the second orientation.

In some embodiments, a support surface or decking (e.g., metal decking) can form a catwalk 120 around a portion of the periphery of the tank 102. For example, the catwalk 120 may extend around three (3) sides of the tank 102 (e.g., as described with reference to FIGS. 15 through 17). The catwalk 120 may be formed of C-channel metal decking and can allow an operator to access the tank 102. For instance, the operator may walk about the tank 102 for inspection and/or refilling operations. However, metal C-channel decking that extends around three (3) sides of a tank 102 is provided by way of example and is not meant to limit the present disclosure. In other embodiments, decking formed of different material can be used. The catwalk 102 can also extend fully or partially around more sides (e.g., four (4) sides) or fewer sides (e.g., two (2) sides, one (1) side) of the tank 102. For example, a larger tank 102 may extend substantially the entire distance between opposing linkage assemblies 110, and the catwalk 120 may be positioned on only one side (e.g., a back side) of the tank 102.

In some embodiments, the tank 102, the saddle 118, and/or the catwalk 120, can be supported from the linkage assemblies 110 by arms 124, which may be angled downwardly from the linkage assemblies 110 and inwardly toward the tank 102. In the case of a larger tank 102 (e.g., extending substantially the entire distance between opposing linkage assemblies 110), the arms 124 may be angled directly downwardly from the linkage assemblies 110 and connected to the saddle 118 and/or the catwalk 120. In this manner, the tank 102 may be positioned at a comparatively lower height with respect to the ground. This can further aid in the ease of an operator accessing the tank 102 (e.g., for a refilling operation, an inspection operation, etc.).

The seed hoses 104 can be configured as tubes routed from the bottom of a hopper or tank 102. In some embodiments, a tube harness can be used to manage the seed hoses 104. For instance, one or more (e.g., two) guides can be used for retaining the seed hoses 104. Further, a supporting member, such as a cross tube 114 and/or a tray or another supporting member, with one or more biasing members, such as springs 116 or one or more other biasing members, can be used to lift the seed hoses 104 up and out of the way as the hopper or tank 102 is raised to the second orientation.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A seed planter assembly for planting seeds in rows throughout a field, the seed planter assembly comprising:
   at least one tank for storing the seeds;
   a support frame for supporting the at least one tank;
   a rigid saddle for supporting the at least one tank, the saddle having a first end and a second end opposite the first end with a support extending transversely from the first end to the second end of the saddle, the at least one tank supported between the first end and the second end of the saddle;
   at least one linkage assembly coupled with the support frame and the saddle for lifting the at least one tank from a first orientation proximate to a support surface to a second orientation spaced farther apart from the support surface, the at least one tank maintained at a substantially level orientation with respect to the support surface in both the first orientation and the second orientation by the at least one linkage assembly when the support surface is level, the at least one linkage assembly having a first link at the support frame, and a second link at the saddle and extending between the first end of the saddle and the second end of the saddle, the first link and the second link each maintained at least substantially horizontally with respect to the support surface in both the first orientation and the second orientation of the at least one tank; and
   an actuator connected between the support frame and the linkage assembly for moving the at least one tank between the first orientation and the second orientation.

2. The seed planter assembly as recited in claim 1, wherein the actuator comprises a hydraulic actuator.

3. The seed planter assembly as recited in claim 1, wherein a catwalk extends at least partially around the at least one tank.

4. The seed planter assembly as recited in claim 1, further comprising a seed hose in communication with the at least one tank for delivering the seeds to the field, and a tube harness for supporting the seed hose and at least one biasing member for biasing the tube harness.

5. The seed planter assembly as recited in claim 1, further comprising a seed hose in communication with the at least one tank for delivering the seeds to the field, and at least one row unit coupled to the at least one tank by the seed hose.

6. A seed planter assembly for planting seeds in rows throughout a field, the seed planter assembly comprising:
   at least one tank for storing the seeds;
   a support frame for supporting the at least one tank;
   a rigid saddle for supporting the at least one tank, the saddle having a first end and a second end opposite the first end with a support extending transversely from the first end to the second end of the saddle, the at least one tank supported between the first end and the second end of the saddle; and a linkage assembly coupled with the support frame and the saddle for lifting the at least one tank from a first orientation proximate to a support surface to a second orientation spaced farther apart from the support surface, the at least one tank maintained at a substantially level orientation with respect to the support surface in both the first orientation and the second orientation by the linkage assembly when the support surface is level, the linkage assembly having a first link at the support frame, and a second link at the saddle and extending between the first end of the saddle and the second end of the saddle, the first link and the second link each maintained at least substantially horizontally with respect to the support surface in both the first orientation and the second orientation of the at least one tank.

7. The seed planter assembly as recited in claim 6, wherein the linkage assembly comprises at least one four-bar linkage coupled with the support frame and the at least one tank.

8. The seed planter assembly as recited in claim 6, wherein an actuator is connected between the support frame and the linkage assembly for moving the at least one tank between the first orientation and the second orientation.

9. The seed planter assembly as recited in claim 8, wherein the actuator comprises a hydraulic actuator.

10. The seed planter assembly as recited in claim 6, wherein a catwalk extends at least partially around the at least one tank.

11. The seed planter assembly as recited in claim 6, further comprising a seed hose in communication with the at least one tank for delivering the seeds to the field, and a tube harness for supporting the seed hose.

12. The seed planter assembly as recited in claim 11, further comprising at least one biasing member for biasing the tube harness.

13. A seed planter assembly for planting seeds in rows throughout a field, the seed planter assembly comprising:
   at least one tank for storing the seeds;
   a support frame for supporting the at least one tank;
   a rigid saddle for supporting the at least one tank, the saddle having a first end and a second end opposite the first end with a support extending transversely from the first end to the second end of the saddle, the at least one tank supported between the first end and the second end of the saddle; and
   a linkage assembly coupled with the support frame and the saddle for lifting the at least one tank from a first orientation proximate to a support surface to a second orientation spaced farther apart from the support surface, the linkage assembly having a first link at the support frame, and a second link at the saddle and extending between the first end of the saddle and the second end of the saddle, the first link and the second link each maintained at least substantially horizontally with respect to the support surface in both the first orientation and the second orientation of the at least one tank; and
   an actuator connected between the support frame and the linkage assembly for moving the at least one tank between the first orientation and the second orientation.

14. The seed planter assembly as recited in claim 13, wherein the linkage assembly comprises at least one four-bar linkage coupled with the support frame and the at least one tank, the at least one tank maintained at a substantially level orientation with respect to the support surface in both the first orientation and the second orientation by the linkage assembly when the support surface is level.

15. The seed planter assembly as recited in claim 13, wherein the actuator comprises a hydraulic actuator.

16. The seed planter assembly as recited in claim 13, wherein a catwalk extends at least partially around the at least one tank.

17. The seed planter assembly as recited in claim 13, further comprising a seed hose in communication with the at least one tank for delivering the seeds to the field, and a tube harness for supporting the seed hose and at least one biasing member for biasing the tube harness.

\* \* \* \* \*